(12) United States Patent
Kitayama et al.

(10) Patent No.: US 10,302,155 B2
(45) Date of Patent: May 28, 2019

(54) ROTATION TRANSMISSION DEVICE

(71) Applicant: NTN CORPORATION, Osaka (JP)

(72) Inventors: Naotsugu Kitayama, Shizuoka (JP);
Shintaro Ishikawa, Shizuoka (JP);
Koji Sato, Shizuoka (JP); Takahide Saito, Shizuoka (JP)

(73) Assignee: NTN CORPORATION, Osaka (JP)

(*) Notice: Subject to any disclaimer, the term of this patent is extended or adjusted under 35 U.S.C. 154(b) by 148 days.

(21) Appl. No.: 15/127,562

(22) PCT Filed: Mar. 26, 2015

(86) PCT No.: PCT/JP2015/059431
§ 371 (c)(1),
(2) Date: Sep. 20, 2016

(87) PCT Pub. No.: WO2015/147188
PCT Pub. Date: Oct. 1, 2015

(65) Prior Publication Data
US 2017/0138415 A1    May 18, 2017

(30) Foreign Application Priority Data

Mar. 27, 2014 (JP) .................. 2014-065572

(51) Int. Cl.
*F16D 41/08* (2006.01)
*F16D 27/06* (2006.01)
(Continued)

(52) U.S. Cl.
CPC ........... *F16D 41/086* (2013.01); *F16D 27/06* (2013.01); *F16D 41/067* (2013.01); *F16D 2023/123* (2013.01)

(58) Field of Classification Search
CPC .................. F16D 27/04; F16D 27/06
See application file for complete search history.

(56) References Cited

U.S. PATENT DOCUMENTS 4,305,198 A * 12/1981 Kanamaru ............. B21K 25/00
                                                        192/107 R
8,973,727 B1 * 3/2015 Takahashi ............. F16D 27/112
                                                        192/110 B
(Continued)

FOREIGN PATENT DOCUMENTS

CA         2831777 A1 * 10/2012 ............ F16D 27/112
EP         1 519 084         3/2005
(Continued)

OTHER PUBLICATIONS

Machine translation of FR2360011 (Year: 2018).*
(Continued)

*Primary Examiner* — Stacey A Fluhart
(74) *Attorney, Agent, or Firm* — Wenderoth, Lind & Ponack, L.L.P.

(57) ABSTRACT

A rotation transmission device includes an electromagnetic clutch including an armature, a rotor having an outer tubular portion and an inner tubular portion, and an electromagnet. A bearing support tube is provided at the outer end surface of a core supporting an electromagnetic coil of the electromagnet. A bearing is mounted in the bearing support tube so as to be axially fixed in position and not to be pulled out of the bearing support tube. The small-diameter tubular portion is provided at the end of the inner tubular portion of the rotor, and press-fitted in the bearing such that the rotor and the electromagnet form a unit.

6 Claims, 6 Drawing Sheets

(51) Int. Cl.
  *F16D 41/067* (2006.01)
  *F16D 23/12* (2006.01)

(56) References Cited

U.S. PATENT DOCUMENTS

| | | | |
|---|---|---|---|
| 9,133,891 B2* | 9/2015 | Ando | F16D 13/385 |
| 2003/0019708 A1 | 1/2003 | Goto et al. | |
| 2004/0110594 A1 | 6/2004 | Goto | |
| 2007/0227853 A1* | 10/2007 | Pardee | F16D 27/112 |
| | | | 192/84.961 |
| 2009/0223768 A1 | 9/2009 | Itomi | |
| 2013/0299298 A1 | 11/2013 | Akiyoshi et al. | |
| 2014/0174873 A1* | 6/2014 | Qin | F16D 13/38 |
| | | | 192/66.32 |

FOREIGN PATENT DOCUMENTS

| | | | | |
|---|---|---|---|---|
| EP | 1 764 525 | | 3/2007 | |
| FR | 2360011 A1 * | | 2/1978 | F16D 27/06 |
| JP | 2003-106346 | | 4/2003 | |
| JP | 2004-60809 | | 2/2004 | |
| JP | 2004-183892 | | 7/2004 | |
| JP | 2005-155834 | | 6/2005 | |
| JP | 2005-308052 | | 11/2005 | |
| JP | 2007-247713 | | 9/2007 | |
| JP | 2008-8447 | | 1/2008 | |
| JP | 2009-8172 | | 1/2009 | |
| JP | 2009-144737 | | 7/2009 | |
| JP | 2009-250281 | | 10/2009 | |
| JP | 2010-65813 | | 3/2010 | |
| JP | 2012-149746 | | 8/2012 | |
| JP | 2013-174345 | | 9/2013 | |
| JP | 2014-25483 | | 2/2014 | |

OTHER PUBLICATIONS

EML 2322L Designing Hubs (Mechanical Power Transmission), published Jan. 8, 2013 (Year: 2013).*
International Preliminary Report on Patentability and Written Opinion of the International Searching Authority dated Sep. 27, 2016 in International (PCT) Application No. PCT/JP2015/059431.
Extended European Search Report dated Mar. 14, 2017 in corresponding European Application No. 15769655.0.

* cited by examiner

ROTATION TRANSMISSION DEVICE

TECHNICAL FIELD

This invention relates to a rotation transmission device used to selectively permit and prohibit transmission of rotation between an input shaft and an output shaft.

BACKGROUND ART

A rotation transmission device is known which is capable of selectively permitting and prohibiting transmission of rotation from an input shaft to an output shaft, and which includes a two-way clutch, and an electromagnetic clutch for selectively engaging and disengaging the two-way clutch.

The rotation transmission device disclosed in JP Patent Publication 2012-149746A includes a control retainer and a rotary retainer mounted between an outer ring and an inner ring mounted inside the outer ring such that the pillars of the respective retainers circumferentially alternate with each other, opposed pairs of rollers, each pair being received in one of pockets defined between adjacent pillars of the retainers, and elastic members each received between a pair of the rollers and biasing the rollers away from each other to standby positions such that one of each pair of rollers becomes wedged between a cylindrical surface and a cam surface when the inner ring rotates in one direction, thereby transmitting the rotation of the inner ring to the outer ring.

This rotation transmission device further includes an electromagnetic clutch mounted on an input shaft on which is provided the inner ring, and configured such that when the electromagnet of the electromagnetic clutch is energized, the control retainer moves in the axial direction. As a result, the control retainer and the rotary retainer rotate relative to each other in the direction in which the circumferential widths of the pockets decrease due to the action of a torque cam, as a motion converting mechanism, disposed between opposed surfaces of a flange of the control retainer and a flange of the rotary retainer. As a result, the pillars of the respective retainers move the pairs of rollers to disengaged positions, thereby prohibiting transmission of rotation from the inner ring to the outer ring.

The electromagnetic clutch comprises an armature coupled to the control retainer, a rotor axially opposed to the armature, and the electromagnet, which is axially opposed to the rotor. The rotor includes an inner tubular portion press-fitted to and thus rotationally fixed to the input shaft.

The electromagnet includes an electromagnetic coil and a core supporting the electromagnetic coil and having one end thereof disposed between an outer tubular portion and the inner tubular portion, of the rotor. The other end portion of the core has its outer periphery supported by the radially inner surface of the housing, and a bearing mounted in the inner periphery of the other end portion of the core rotatably supports the input shaft.

This rotation transmission device is further configured such that when the electromagnet of the electromagnetic clutch is de-energized, the control retainer and the rotary retainer rotate relative to each other in the direction in which the circumferential widths of the pockets increase under the biasing force of the elastic members disposed between the respective opposed pairs of rollers, thereby moving the opposed pairs of rollers to the standby positions, where the rollers can be instantly wedged between the cylindrical surface and the cam surfaces. Thus, the rollers can scarcely move in the rotational direction, so that the rotation transmission device is quick in response.

With the rotation transmission device disclosed in JP Patent Publication 2012-149746A, since the rotor and the electromagnet are separately mounted on the input shaft, it is time-consuming to assemble this rotation transmission device.

Also, since the axial positioning arrangements for the rotor and the electromagnet are spaced apart from each other in the axial direction, the axial overlap distance tends to vary between the outer tubular portion of the rotor and the core of the electromagnet, which is mounted in the outer tubular portion, due to manufacturing and assembling errors. Thus, it is difficult to control this overlap distance, which in turn makes it impossible to stabilize the attraction force applied to the armature. It is therefore desired to make it easier to control the above-mentioned overlap distance.

SUMMARY OF THE INVENTION

An object of the present invention is to provide a rotation transmission device in which an electromagnetic clutch is used to control a two-way clutch capable of selectively permitting and prohibiting transmission of rotation from the input shaft to the output shaft, of which the electromagnetic clutch can be assembled easily, and in which the overlap distance between the outer tubular portion of the rotor of the electromagnetic clutch and the core of the electromagnet of the electromagnetic clutch can be easily controlled.

In order to achieve this object, the present invention provides a rotation transmission device comprising: an input shaft; an output shaft arranged so as to be coaxial with the input shaft; a housing covering ends of the input shaft and an output shaft; a two-way clutch mounted in the housing and configured to selectively allow and prohibit transmission of rotation from the input shaft to the output shaft; and an electromagnetic clutch provided on the input shaft, and configured to selectively engage and disengage the two-way clutch. The electromagnetic clutch comprises: an armature supported so as to be movable in an axial direction of the input shaft; a rotor including an inner tubular portion and an outer tubular portion provided outwardly of the inner tubular portion and different in diameter from the inner tubular portion, the inner tubular portion being fitted on the input shaft, and positioned in the axial direction, while being opposed to the armature; and an electromagnet mounted between the outer tubular portion and the inner tubular portion of the rotor so as to be opposed to the rotor in the axial direction, and configured to apply a magnetic attraction force to the armature that tends to attract the armature to the rotor when the electromagnet is energized. The electromagnet includes an electromagnetic coil and a core supporting the electromagnetic coil, wherein the rotation transmission device is configured such that when the electromagnet is energized, the armature is moved in the axial direction toward the rotor, thereby disengaging the two-way clutch. A bearing support tube is provided at an outer end surface of the core; a small-diameter tubular portion is provided at an end of the inner tubular portion of the rotor and in the bearing support tube; a bearing is mounted in the bearing support tube; and the small-diameter tubular portion is press-fitted in the bearing such that the electromagnet and the rotor form a unit.

By providing a bearing support tube at an outer end surface of the core supporting the electromagnetic coil; providing a small-diameter tubular portion at an end of the inner tubular portion of the rotor and in the bearing support tube; mounting a bearing in the bearing support tube; and press-fitting the small-diameter tubular portion press-fitted in the bearing such that the electromagnet and the rotor form a unit, it is possible to simultaneously mount the electromagnet and the rotor on the input shaft. Therefore, the electromagnetic clutch can be assembled easily, compared to when the electromagnet and the rotor are mounted separately.

By pressing-fitting the small-diameter tubular portion into the bearing, and bringing the bearing into abutment with the end surface of the inner tubular portion at the root of the small-diameter portion, it is possible to make the length of the portion of the small-diameter tubular portion press-fitted into the bearing constant, and thus make constant the axial overlap distance between the outer tubular portion of the rotor and the core of the electromagnet. It is thus possible to easily control the overlap distance.

A circumferential groove may be formed in the width surface area of the input shaft on which the inner tubular portion is fitted, in order to reduce magnetic leakage from the inner tubular portion to the input shaft. As a result, it is possible to stably attract the armature to the rotor, and also possible to use an electromagnet that is smaller in capacity, which in turn increases the freedom of design.

The bearing support tube may include, at an end portion thereof, an outwardly extending flange that abuts and is joined to the outer end surface of the core, the outwardly extending flange having a radially outer surface which is fitted to a radially inner surface of the housing, and the core has a radially outer surface which is uniform in diameter over the entire axial length of the core. With this arrangement, compared to an arrangement in which an annular protrusion is formed on the radially outer surface of the core at its end, the annular protrusion is supported on the radially inner surface of the housing, the core has a large axial length, and the outer tubular portion of the rotor also has a correspondingly large axial length. As a result, it is possible to correspondingly increase the axial overlap distance between the outer tubular portion and the core, and thus to increase the attraction force applied to the armature.

By providing a rotational fixing arrangement between the input shaft and the rotor so that the input shaft and the rotor always rotate in unison with each other, while the armature is attracted to the rotor, and the pairs of rollers of the two-way clutch are disengaged, the rotor and the armature rotate in unison with the input shaft. Thus, the control retainer and the rotary retainer rotate in unison with each other, so that, in this state, the pairs of rollers are positively prevented from untimely engaging.

The rotational fixing arrangement may comprise a key, or light press-fitting of the rotor to the input shaft. If the rotational fixing arrangement comprises strong press-fitting, it will be time-consuming to dismount the assembled unit of the rotor and the electromagnet from the input shaft, and also, parts could be damaged while dismounting the assembled unit. By using one of the above-mentioned rotational fixing arrangements, the assembled unit can be easily dismounted without being damaged.

The rotation transmission device according to the present invention may further comprise a ring made of a non-magnetic material and disposed between fitting surfaces of the input shaft and the rotor. Such a ring effectively prevents magnetic leakage to the input shaft.

Advantages of the Invention

According to the present invention, since a bearing support tube is provided at an outer end surface of the core of the electromagnet, and a small-diameter tubular portion provided at an end of the inner tubular portion of the rotor is press-fitted in a bearing mounted in the bearing support tube such that the electromagnet and the rotor form a unit, it is possible to simultaneously mount the electromagnet and the rotor on the input shaft, so that the rotation transmission device can be assembled easily.

Also, the present invention makes it possible to easily control the overlap distance between the outer tubular portion of the rotor and the core of the electromagnet, which in turn stabilizes the attraction force applied to the armature.

BRIEF DESCRIPTION OF THE DRAWINGS

FIG. 7(*a*) is a sectional view taken along line VII-VII of FIG. 6;
and FIG. 7(*b*) is a sectional view showing an operational state.

DETAILED DESCRIPTION OF THE INVENTION

Figure 1:
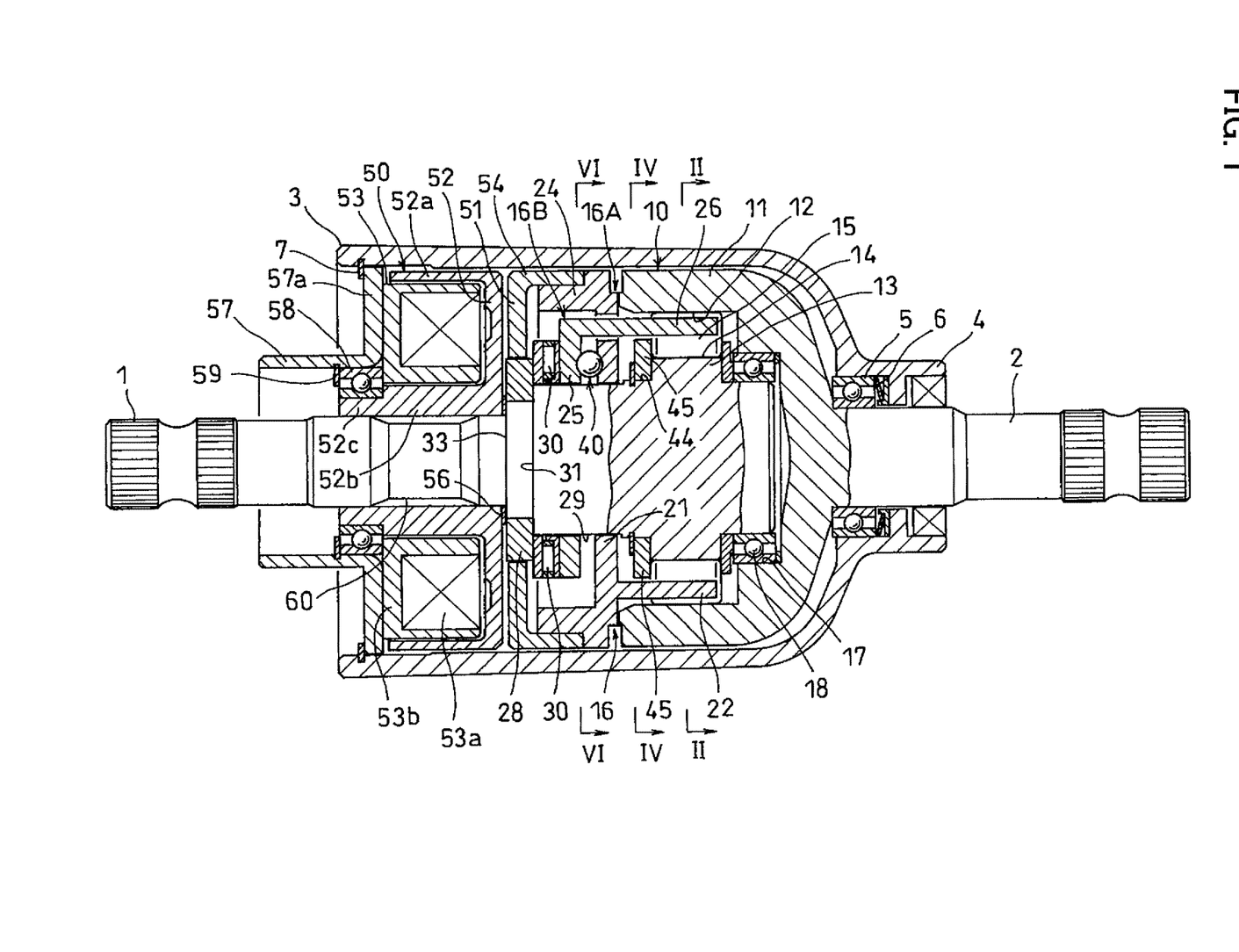
FIG. 1 is a vertical sectional view of a rotation transmission device embodying the present invention.

The embodiment is now described with reference to the drawings. FIG. 1 shows a rotation transmission device embodying the present invention. As shown, the rotation transmission device comprises an input shaft 1, an output shaft 2 arranged coaxially with the input shaft 1, a housing 3 covering the input shaft 1 and the output shaft 2, a two-way clutch 10 mounted in the housing 3 and configured to selectively allow and prohibit transmission of rotation from the input shaft 1 to the output shaft 2, and an electromagnetic clutch 50 configured to selectively engage and disengage the two-way clutch 10.

The housing 3 is cylindrical in shape, and includes a small-diameter bearing tube 4 at one axial end thereof. A bearing 5 is mounted in the bearing tube 4, and rotatably supports the output shaft 2. An elastic member 6 comprising a disc spring is also mounted in the bearing tube 4, and biases the two-way clutch 10 and the electromagnetic clutch 50 toward an anti-pullout ring 7 comprising a snap ring mounted on the inner periphery of the housing 3 near its open end.

Figure 2:
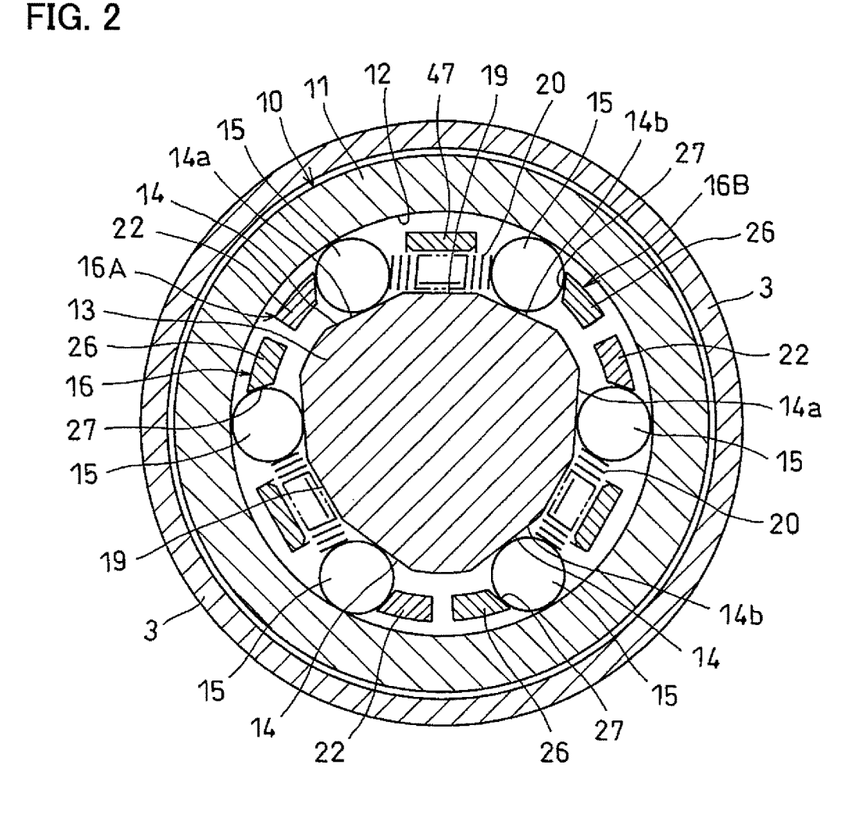
FIG. 2 is a sectional view taken along line II-II of FIG. 1.

As shown in FIGS. 1 and 2, the two-way clutch 10 includes an outer ring 11 provided at the end of the output shaft 2 and having on its inner periphery a cylindrical surface 12, and an inner ring 13 provided at the end of the input shaft 2 and having on its outer periphery a plurality of cam surfaces 14 equidistantly spaced apart from each other in the circumferential direction. A pair of rollers 15, as engaging elements, and an elastic member 20 are mounted between each cam surface 14 and the cylindrical surface 12, with the rollers 15 retained by a retainer assembly 16, such that when the inner ring 13 rotates in one direction, one of each pair of the rollers 15 engages the cylindrical surface 12 and the cam surface 14, thereby transmitting the rotation of the inner ring 13 to the outer ring 11. When the inner ring 13 rotates in the opposite direction, the other of each pair of the rollers 15 engages the cylindrical surface 12 and the cam surface 14, thereby transmitting the rotation of the inner ring 13 to the outer ring 11.

The outer ring 11 has a closed end having an inner surface formed with a small-diameter recess 17 in which is mounted a bearing 18 rotatably supporting the end portion of the inner ring 13.

Figure 3:
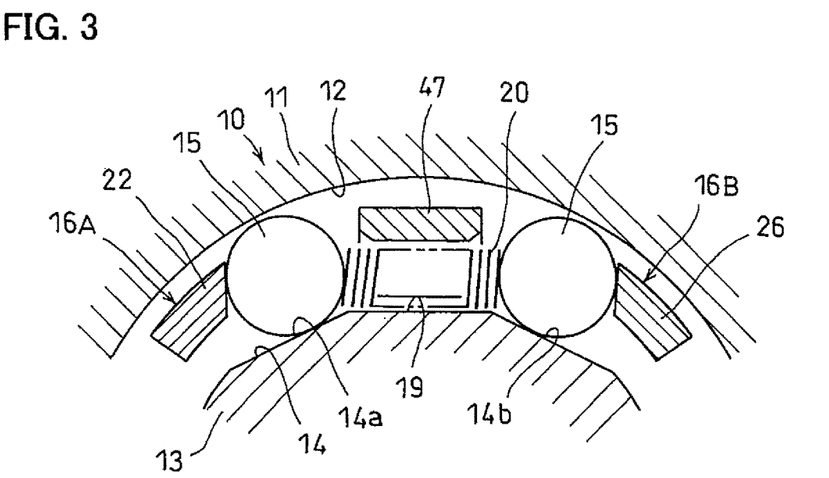
FIG. 3 is a sectional view showing a state in which rollers shown in FIG. 2 are disengaged.

In the embodiment, the inner ring 13 is integrally formed on the end portion of the input shaft 1, but the inner ring 13 may be formed as a separate member from the input shaft 1 and rotationally fixed to the input shaft 1 through serrations. As shown in FIG. 3, each cam surface 14 formed on the outer periphery of the inner ring 13 includes a pair of ramps 14a and 14b that are inclined in opposite directions to each other, and defines a wedge-shaped space which narrows toward the respective circumferential ends thereof, between the cam surface 14 and the cylindrical surface 12 of the outer ring 11. Between the pair of ramps 14a and 14b, a flat spring support surface 19 is provided which extends in the tangential direction of the inner ring 13 and supports the elastic member 20.

Each elastic member 20 comprise a coil spring disposed between the pair of rollers 15 and biasing the pair of rollers 15 away from each other to standby positions shown in FIG. 2, where the rollers 15 are in engagement with the cylindrical surface 12 and the cam surface 14.

Figure 6:
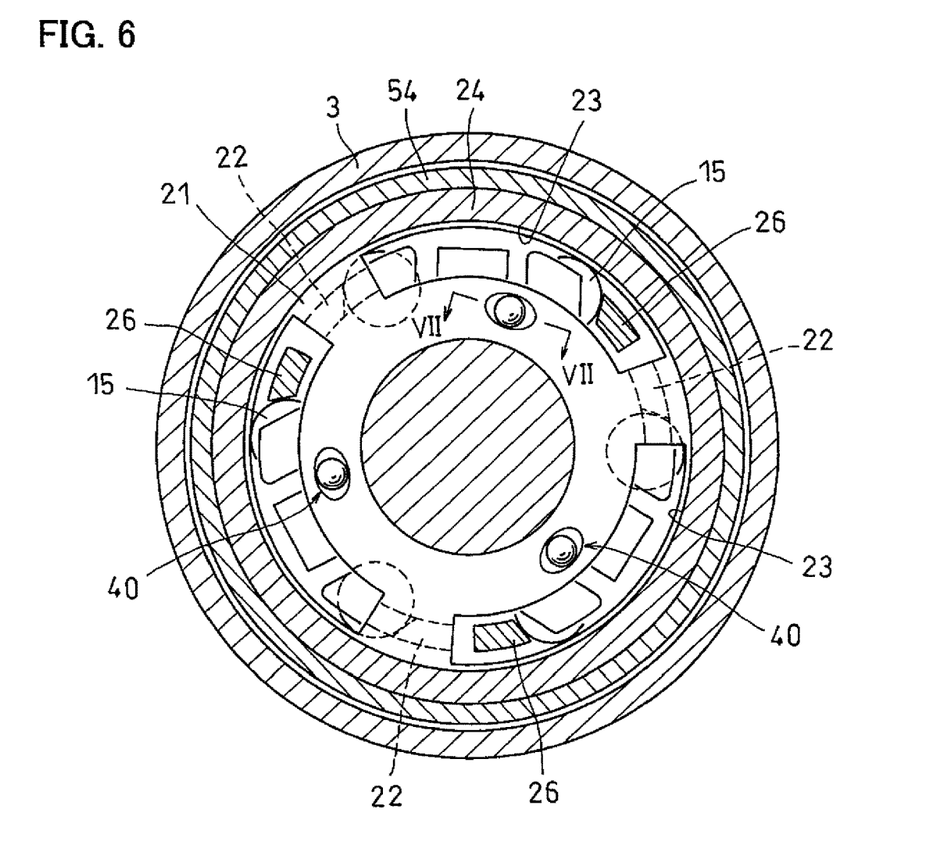
FIG. 6 is a sectional view taken along line VI-VI of FIG. 1.
Figure 8:
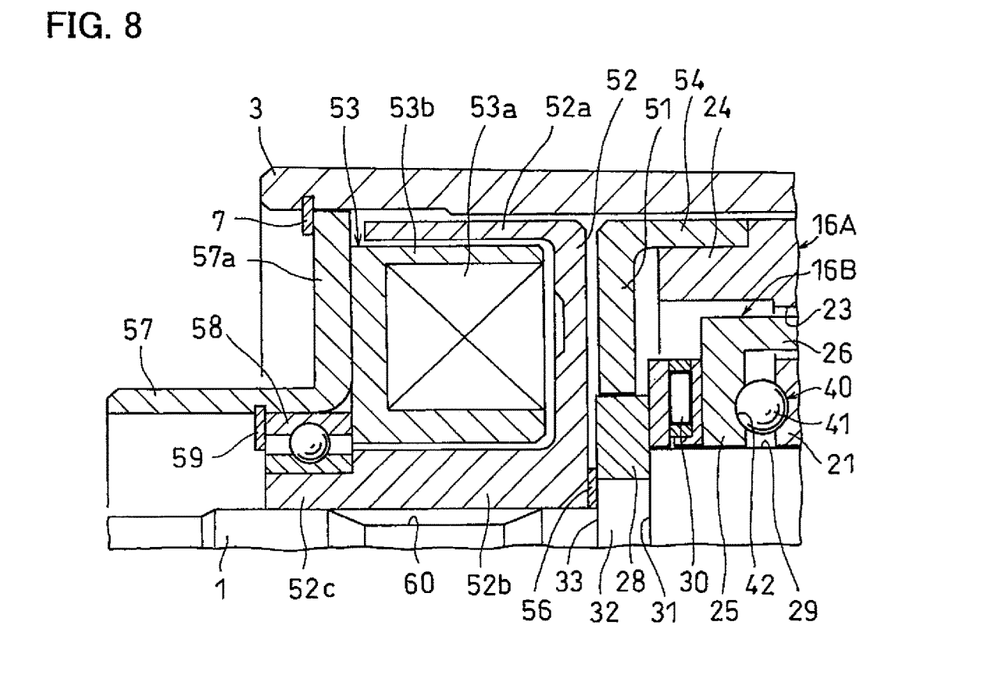
FIG. 8 is an enlarged sectional view of and around an electromagnetic clutch shown in FIG. 1.

As shown in FIGS. 1 and 2, the retainer assembly 16 comprises a control retainer 16A and a rotary retainer 16B. As shown in FIGS. 1, 6 and 8, the control retainer 16A includes an annular flange 21, and pillars 22 which are equal in number to the number of the cam surfaces 14, and extend from the outer peripheral portion of one of the opposite sides of the annular flange 21 so as to be circumferentially equidistantly spaced apart from each other. The annular flange 21 is formed with circular arc-shaped elongated holes 23 between the adjacent pillars 22. The control retainer 16A further includes a tubular portion 24 extending from the outer periphery of the annular flange 21 in the direction opposite to the direction in which the pillars 22 extend.

The rotary retainer 16B includes an annular flange 25, and pillars 26 equal in number to the number of the cam surfaces 14 and extending from the outer periphery of the annular flange 25 so as to be circumferentially equidistantly spaced apart from each other.

The control retainer 16A and the rotary retainer 16B are assembled together such that the pillars 26 of the rotary retainer 16B are inserted through the respective elongated holes 23 so as to circumferentially alternate with the pillars 22, with the distal end portions of the pillars 22 and 26 disposed between the outer ring 11 and the inner ring 13, and with the flange 21 of the control retainer 16A and the flange 25 of the rotary retainer 16B disposed between a support ring 28 fitted on the outer periphery of the input shaft 1 and the open end surface of the outer ring 11.

With the retainers 16A and 16B assembled together in this manner, as shown in FIG. 2, pockets 27 are defined between the pillars 22 of the control retainer 16A and the pillars 26 of the rotary retainer 16B. The pockets 27 are radially opposed to the respective cam surfaces 14 of the inner ring 13. An opposed pair of the rollers 15, as the engaging elements, and one of the elastic members 20 are mounted in each pocket 27.

As shown in FIG. 8, the flange 21 of the control retainer 16A is supported on, so as to be slidable along, a slide guide surface 29 formed on the outer periphery of the input shaft 1. The rotary retainer 16B is rotatably supported by a thrust bearing 30 mounted between its flange 25 and the above-described support ring 28, which is fitted on the input shaft 1.

The thrust bearing 30 rotatably supports the rotary retainer 16B, while preventing the movement of the rotary retainer 16B toward the electromagnetic clutch 50.

Between the flange 21 of the control retainer 16A and the flange 25 of the rotary retainer 16B, a torque cam 40 as a motion converting mechanism is provided which is configured to convert the axial movement of the control retainer 16A to the relative rotation between the control retainer 16A and the rotary retainer 16B.

As shown in FIGS. 7(a) and 7(b), the torque cam 40 includes pairs of cam grooves 41 and 42 formed in the respective opposed surfaces of the flange 21 of the control retainer 16A and the flange 25 of the rotary retainer 16B, and each shaped such that it is the deepest at the circumferentially central portion thereof, its depth gradually decreases toward its respective circumferential ends, and balls 43 each mounted between one and the other circumferential end portions of an opposed pair of the cam grooves 41 and 42.

In the embodiment, the cam grooves 41 and 42 have a circular arc-shaped section, but they may have a V-shaped section.

The torque cam 40 is configured such that when the control retainer 16A moves in the axial direction in which the flange 21 of the control retainer 16A approaches the flange 25 of the rotary retainer 16B, the balls 43 roll toward the deepest portions of the cam grooves 41 and 42 (position shown in FIG. 7(a)), thereby allowing the control retainer 16A and the rotary retainer 16B to rotate relative to each other in the direction in which the circumferential widths of the pockets 27 decrease.

As shown in FIG. 1, the inner ring 13 has, at its end on the side of the slide guide surface 29 formed on the input shaft 1, a holder fitting surface 44 having a diameter substantially equal to the diameter of the slide guide surface 29. An annular spring holder 45 is fitted on the holder fitting surface 44 to prevent separation of the rollers 15 and the elastic members 20 in the axial direction.

Figure 4:
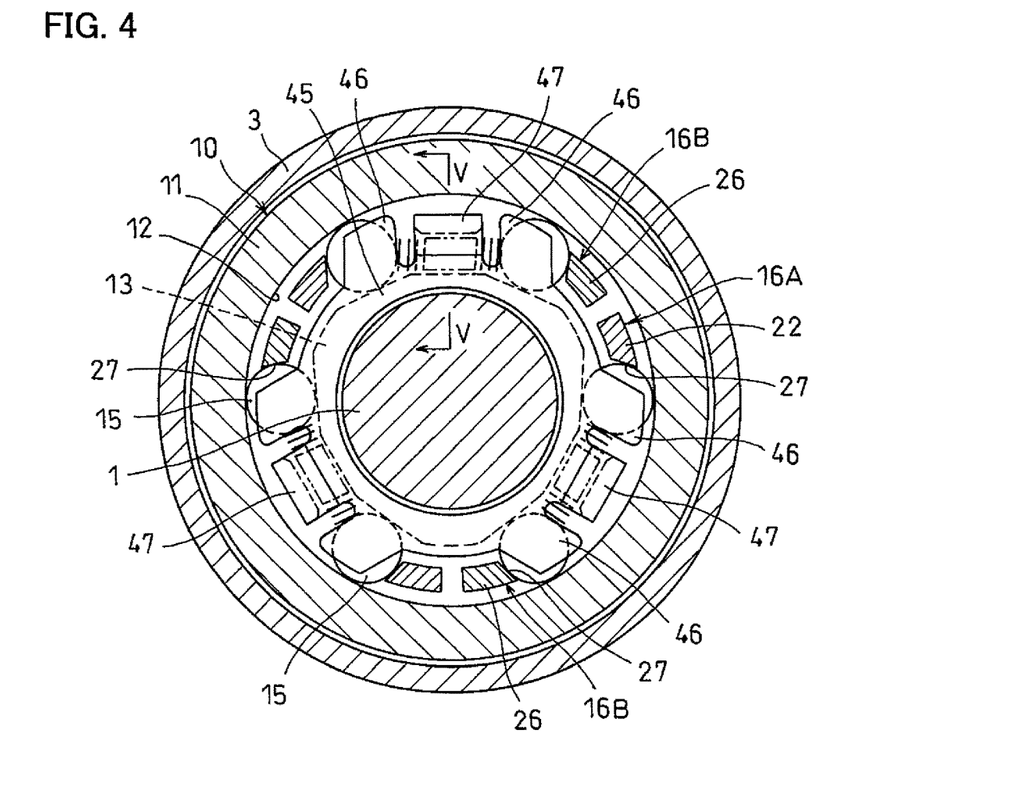
FIG. 4 is a sectional view taken along line IV-IV of FIG. 1.
Figure 5:
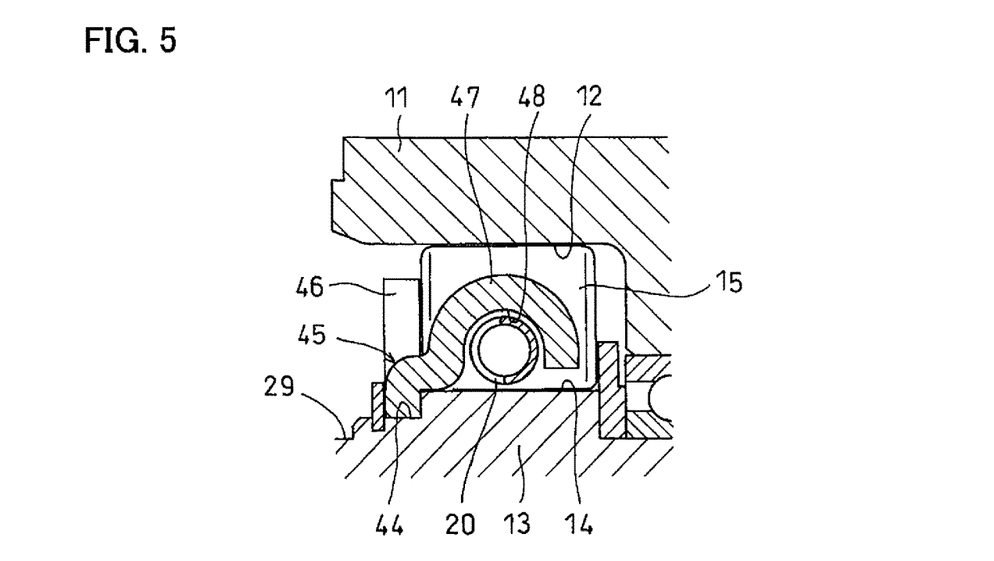
FIG. 5 is a sectional view taken along line V-V of FIG. 4.

The spring holder 45 is axially positioned by abutting an axial end surface of the inner ring 13. As shown in FIGS. 4 and 5, the spring holder 45 has, on its outer periphery, a plurality of braking pieces 46 disposed between the pillars 22 of the control retainer 16A and the pillars 26 of the rotary retainer 16B.

The braking pieces 46 are configured such that when the control retainer 16A and the rotary retainer 16B rotate relative to each other in the direction in which the circumferential widths of the pockets 27 decrease, the braking pieces 46 receive the pillars 22 of the control retainer 16A and the pillars 26 of the rotary retainer 16B on the respective side edges thereof, thereby keeping the respective opposed pairs of rollers 15 at neutral positions where the rollers 15 are disengaged.

The spring holder 45 further includes spring holding pieces 47 arranged between adjacent pairs of the braking pieces 46 and extending in the axial direction at positions radially outwardly of the respective elastic members 20. Each spring holding piece 47 has, in its radially inner portion, a cutout 48 in which is fitted the outer peripheral portion of the elastic member 20 such that the elastic member 20 is prevented from moving in the axial direction of the rollers 15, and thus prevented from being pulled out from between the opposed pair of rollers 15.

As shown in FIGS. 1 and 8, the electromagnetic clutch 50 includes an armature 51 axially opposed to the end surface of the tubular portion 24 of the control retainer 16A, a rotor 52 axially opposed to the armature 51, and an electromagnet 53 axially opposed to the rotor 52.

The armature 51 is rotatably and slidably supported by the above-described support ring 28, which is provided on the input shaft 1. The armature 51 includes, at its outer peripheral portion, a coupling tube 54. The tubular portion 24 of the control retainer 16A is press-fitted in the radially inner surface of the coupling tube 54 so that the control retainer 16A and the armature 51 are fixedly coupled together. As a result, the armature 51 is slidably supported at two axially spaced apart locations, namely, on the outer periphery of the support ring 28, and on the slide guide surface 29 on the outer periphery of the input shaft 1.

The support ring 28 is axially positioned by a step 31 at the other axial end of the slide guide surface 29 of the input shaft 1.

The rotor 52 includes an outer tubular portion 52*a* and an inner tubular portion 52*b* at its respective outer and inner peripheries. The inner tubular portion 52*b* is fitted on the input shaft 1. The rotor 52 is axially positioned by a shim 56 disposed between the rotor 52 and an end surface 33 of a ring support shaft portion 32 supporting the support ring 28.

The electromagnet 53 includes an electromagnetic coil 53*a*, and a core 53*b* supporting the electromagnetic coil 53*a*. The core 53*b* is inserted between the outer tubular portion 52*a* and the inner tubular portion 52*b* of the rotor 52 so as to axially overlap the outer tubular portion 52*a*. The letter "L" in FIG. 11 indicates the overlap distance between the core 53*b* and the outer tubular portion 52*a*.

An outwardly extending flange 57*a* of a bearing support tube 57 is joined to the core 53*b*, while in abutment with the outer end surface of the core 53*b*. The bearing support tube 57 has an inner diameter larger than the inner diameter of the core 53*b*, and a bearing 58 is fitted in the bearing support tube 57.

The bearing 58 is positioned in the axial direction by being in abutment with the outer end surface of the core 53*b*, and prevented from being pulled out by a snap ring 59 mounted on the inner periphery of the bearing support tube 57.

The inner tubular portion 52*b* of the rotor 52 has an end portion formed as a small-diameter tubular portion 52*c* which is press-fitted to the radially inner surface of the bearing 58 so that the rotor 52 and the electromagnet 53 are formed into a single unit. The rotor 52 and the electromagnet 53 are rotatable relative to each other by the bearing 58.

As shown in FIG. 8, the inner tubular portion 52*b* of the rotor 52 is fitted on the input shaft 1 so that the assembled unit of the rotor 52 and the electromagnet 53 is supported by the input shaft 1 at its radially inner surface. The outwardly extending flange 57*a* is fitted to the radially inner surface of the housing 3 such that the radially outer surface of the outwardly extending flange 57*a* is supported by the radially inner surface of the housing 3. The snap ring 7 prevents the outwardly extending flange 57*a* from being pulled out.

The rotor 52 is pressed against the end surface 33 of the ring support shaft portion 32 under the biasing force of the elastic member 6 mounted in the bearing tube 4 of the housing 3, see FIG. 1, so as to rotate in unison with the input shaft 1.

FIG. 1 shows this rotation transmission device when the electromagnetic coil 53*a* of the electromagnet 53 is not energized. In this state, the armature 51 is spaced apart from the rotor 52, while each opposed pair of the rollers 15 of the two-way clutch 10 are, as shown in FIG. 2, in the standby positions, in which the rollers 15 engage the cylindrical surface 12 of the outer ring 11 and the cam surface 14 of the inner ring 13.

With the two-way clutch 10 in the standby position, when the electromagnetic coil 53*a* is energized, an attraction force acts on the armature 51 and moves the armatures 51 in the axial direction until the armature 51 is pressed against the rotor 52.

Since the armature 51 is fixedly coupled to the control retainer 16A due to the coupling tube 54 being press-fitted to the tubular portion 24, when the armature 51 is moved in the above axial direction, the control retainer 16A is moved in the direction in which its flange 21 moves toward the flange 25 of the rotary retainer 16B.

Figure 7:
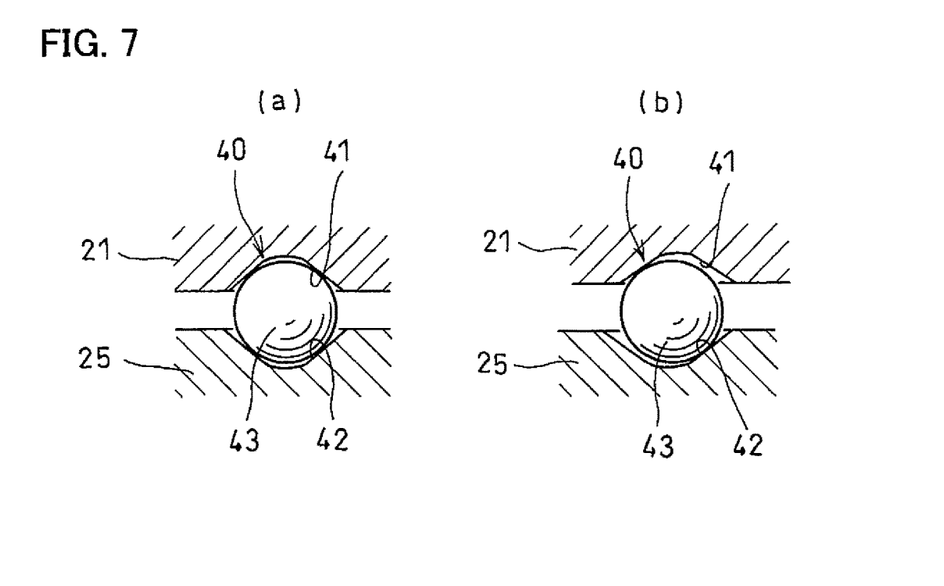

At that time, each ball 43, shown in FIG. 7(*b*), rolls toward the deepest portions of the respective cam grooves 41 and 42 (positions shown in FIG. 7(*a*)), so that the control retainer 16A and the rotary retainer 16B rotate relative to each other in the direction in which the circumferential widths of the pockets 27 decrease. This causes each opposed pair of the rollers 15 to be pushed, respectively, by the pillar 22 of the control retainer 16A and the pillar 26 of the rotary retainer 16B, and moved toward each other. As a result, the rollers 15 are moved from the engagement standby state to the neutral state, shown in FIG. 3, and the two-way clutch 10 is disengaged.

With the two-way clutch 10 disengaged, when torque is applied to the input shaft 1 to rotate the inner ring 13 in one direction, the rotor 52, press-fitted to the input shaft 1, rotates in unison with the input shaft 1, and so do the armature 51, because the armature 51 is pressed against the rotor 52, and the control retainer 16A, because the control retainer 16A is press-fitted to the armature 51. As a result, the rotary retainer 16B is also rotated through the torque cam 40. Since, at that time, the opposed pairs of rollers 15 are in the neutral positions, where they are disengaged, the rotation of the inner ring 13 is not transmitted to the outer ring 11, that is, the inner ring 13 rotates independently of the outer ring 11.

When the control retainer 16A and the rotary retainer 16B rotate relative to each other in the direction in which the circumferential widths of the pockets 27 decrease, either the pillars 22 of the control retainer 16A or the pillars 26 of the rotary retainer 16B rotate until they abut the edges of the respective braking pieces 46 of the spring holder 45, and prevented from rotating any further, while the other pillars 22, 26 rotate further, in the direction in which the circumferential widths of the pockets 27 decrease, by the distance converted, by the torque cam 40, from the axial distance by which the armature 51 is moved until the armature 51 contacts the rotor 52, and reach substantially the neutral state eventually.

This prevents the elastic members 20 from being compressed more than necessary, thus preventing breakage of the elastic members 20 due to fatigue, even after repeated expansion and compression of the elastic members 20.

With the inner ring 13 rotating independently of the outer ring 11, when the electromagnetic coil 53*a* is de-energized, attraction force on the armature 51 disappears, thus causing the control retainer 16A and the rotary retainer 16B to rotate relative to each other in the direction in which the circumferential widths of the pockets 27 increase. As a result, as shown in FIG. 2, each pair of rollers 15 are moved to the standby positions where they engage the cylindrical surface 12 and the cam surface 14, so that one of each pair of rollers 15 becomes wedged between the cylindrical surface 12 and the cam surface 14 due to the rotation of the input shaft 1, thus allowing transmission of torque in one direction between the inner ring 13 and the outer ring 11.

In this state, when the input shaft 1 is stopped and then rotated in the opposite direction, the other of each pair of rollers 15 becomes wedged between the cylindrical surface 12 and the cam surface 14, so that the rotation of the inner ring 13 is transmitted to the outer ring 11.

Since this rotation transmission device is configured such that by de-energizing the electromagnetic coil 53a, the control retainer 16A and the rotary retainer 16B rotate relative to each other in the direction in which the circumferential widths of the pockets 27 increase, thereby moving the opposed pairs of rollers 15 to the standby positions, where the rollers can be instantly wedged between the cylindrical surface 12 and the cam surfaces 14, the rollers 15 can scarcely move in the rotational direction. Since the inner ring 13 is integral with the input shaft 1, the rotation of the input shaft 1 can be instantly transmitted to the outer ring 11 through the inner ring 13.

Since torque is transmitted from the inner ring 13 to the outer ring 11 through rollers 15 which are equal in number to the cam surfaces 14, it is possible to transmit a large torque from the inner ring 13 to the outer ring 11.

When the control retainer 16A and the rotary retainer 16B rotate relative to each other in the direction in which the circumferential widths of the pockets 27 increase, each ball 43 rolls toward shallow portions of the respective pair of cam grooves 41 and 42 until it reaches the position shown in FIG. 7(b).

Figure 11:
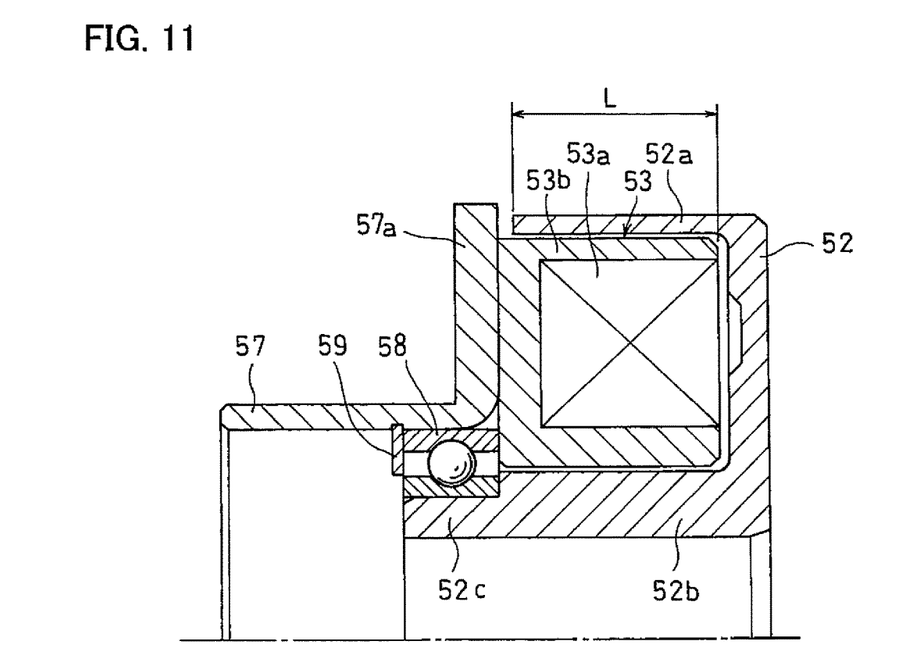
FIG. 11 is a sectional view of an assembled unit of a rotor and an electromagnet.

With the rotation transmission device of the embodiment, as shown in FIGS. 8 and 11, the bearing support tube 57 is provided at the axial outer end surface of the core 53b supporting the electromagnetic coil 53a; the bearing 58 mounted in the bearing support tube 57 is in abutment with the outer end surface of the core 53b for positioning, and is prevented from being pulled out by mounting the snap ring 59; and the small-diameter tubular portion 52c at the end of the inner tubular portion 52b of the rotor 52 is press-fitted in the bearing 58 to form the electromagnet 53 and the rotor 52 into a single unit. Thus, the rotor 52 and the electromagnet 53 can be simultaneously mounted on the input shaft 1, so that the rotor 52 and electromagnet 53 can be easily mounted in position.

By press-fitting the small-diameter tubular portion 52c into the bearing 58 until the end surface of the inner tubular portion 52b abuts the bearing 58, the length of the press-fitted portion can be made constant, so that the overlap distance L between the outer tubular portion 52a of the rotor 52 and the core 53b of the electromagnet 53 can be made constant and thus can be easily controlled. By controlling the overlap distance L, it is possible to stabilize the attraction force applied to the armature 51.

As shown in FIG. 8, by forming a circumferential groove 60 in the outer periphery of the input shaft 1 within its width surface area on which the inner tubular portion 52b is fitted, it is possible to reduce the leakage of magnetism from the inner tubular portion 52b to the input shaft 1, thus making it possible to stably attract the armature 51 to the rotor 52.

As shown in FIG. 8, by supporting the radially outer surface of the outwardly extending flange 57a provided at the end of the bearing support tube 57 on the radially inner surface of the housing 3, and forming the core 53b such that its radially outer surface has a constant diameter over the entire axial length thereof, the outer tubular portion 52a of the rotor 52 has a large axial length, compared to an arrangement in which an annular protrusion is formed on the radially outer surface of the core 53b at its end, and this annular protrusion is supported on the radially inner surface of the housing 3. As a result, it is possible to increase the axial overlap distance L between the outer tubular portion 52a and the core 53b, and thus to increase the attraction force applied to the armature 51.

Figure 9:
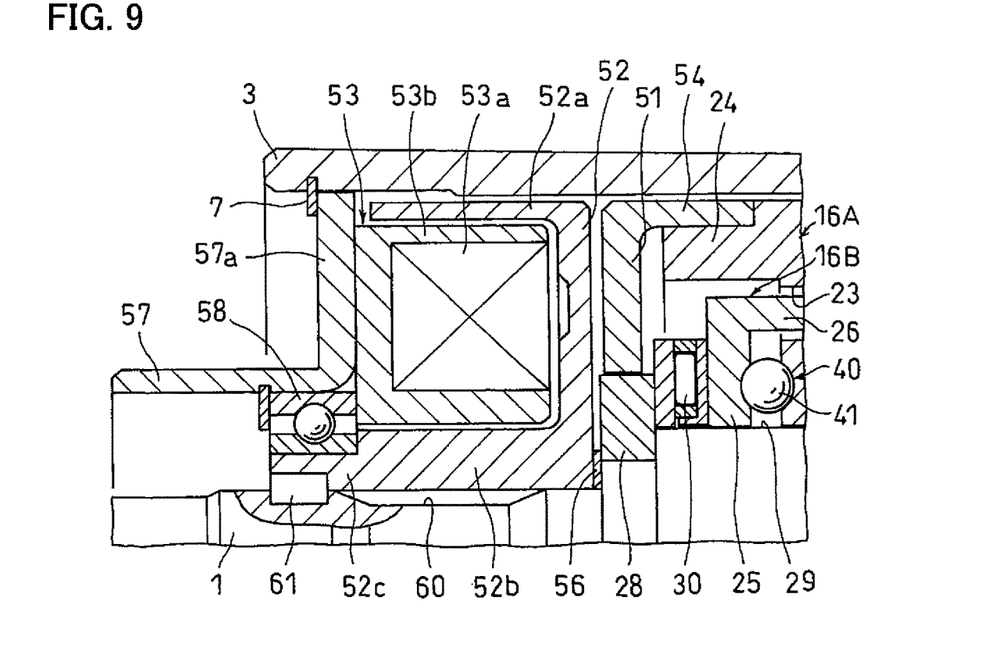
FIG. 9 is a sectional view of a different rotational fixing arrangement for a rotor.

In FIG. 1, the rotor 52 is rotationally fixed to the input shaft 1 by pressing the rotor 52 against the end surface 33 of the ring support shaft portion 32 of the input shaft 1 under the spring load of the elastic member 6 comprising a disk spring. However, as shown in FIG. 9, the rotor 52 may be rotationally fixed to the input shaft 1 by means of keys 61.

Also, the rotor 52 may be rotationally fixed to the input shaft 1 by lightly press-fitting the inner tubular portion 52b to the input shaft 1.

By using one, some or all of such rotational fixing arrangements, the assembled unit comprising the rotor 52 and the electromagnet 53 can be easily disassembled without damaging it.

Figure 10:
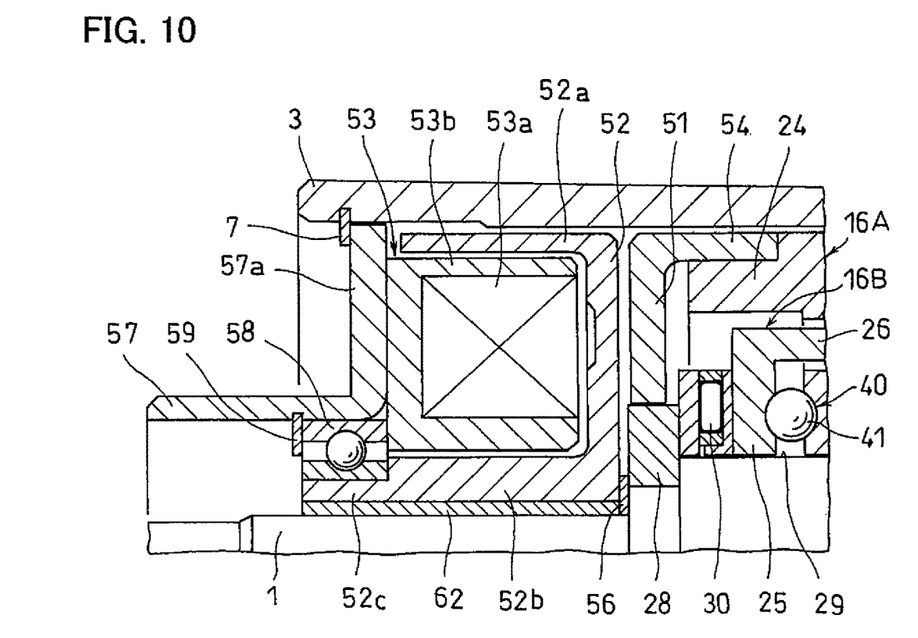
FIG. 10 is a sectional view showing a different means for preventing leakage of magnetic fluxes.

As shown in FIG. 10, by disposing a non-magnetic ring 62 made of a non-magnetic material between the fitting surfaces of the input shaft 1 and the rotor 52, it is possible to effectively prevent leakage of magnetism to the input shaft 1.

DESCRIPTION OF REFERENCE NUMERALS

1. Input shaft
2. Output shaft
3. Housing
10. Two-way clutch
11. Outer ring
13. Inner ring
15. Roller (engaging element)
16A. Control retainer
16B. Rotary retainer
20. Elastic member
22. Pillar
24. Tubular portion
26. Pillar
27. Pocket
40. Torque cam (motion converting mechanism)
50. Electromagnetic clutch
51. Armature
52. Rotor
52a. Outer tubular portion
52b. Inner tubular portion
52c. Small-diameter tubular portion
53. Electromagnet
53a. Electromagnetic coil
53b. Core
57. Bearing support tube
57a. Outwardly extending flange
58. Bearing
60. Circumferential groove
61. Key
62. Non-magnetic ring

What is claimed is:

1. A rotation transmission device comprising:
an input shaft;
an output shaft arranged so as to be coaxial with the input shaft;
a housing covering ends of the input shaft and the output shaft;
a two-way clutch mounted in the housing and configured to selectively permit and prohibit transmission of rotation from the input shaft to the output shaft; and
an electromagnetic clutch provided on the input shaft, and configured to selectively engage and disengage the two-way clutch,
wherein the electromagnetic clutch comprises:
an armature supported so as to be movable in an axial direction of the input shaft;
a rotor including an inner tubular portion and an outer tubular portion provided outwardly of the inner tubular portion and different in diameter from the inner tubular portion, the inner tubular portion being fitted on the input shaft, and positioned in the axial direction, while being opposed to the armature, the input shaft and the rotor being fixed together so as to prevent relative rotation between the input shaft and the rotor; and
an electromagnet mounted between the outer tubular portion and the inner tubular portion of the rotor so as to be opposed to the rotor in the axial direction, and configured to apply a magnetic attraction force to the armature that tends to attract the armature to the rotor, when the electromagnet is energized, the electromagnet including an electromagnetic coil and a core supporting the electromagnetic coil,
wherein the rotation transmission device is configured such that when the electromagnet is energized, the armature is moved in the axial direction toward the rotor, thereby disengaging the two-way clutch;
wherein a bearing support tube is provided at an outer end surface of the core, a small-diameter tubular portion is provided at an end of the inner tubular portion of the rotor and in the bearing support tube, a bearing is mounted in the bearing support tube, and the small-diameter tubular portion is press-fitted in the bearing such that the electromagnet and the rotor form a unit; and
wherein a circumferential groove is formed in the input shaft such that the inner tubular portion of the rotor fitted to the input shaft surrounds the circumferential groove, such that the electromagnetic coil is located radially outward of the circumferential groove, and such that portions of the input shaft on both axial sides of the circumferential groove are fitted in and support a radially inner surface of the rotor.

2. The rotation transmission device of claim 1, further comprising a key mounted to rotationally fix the rotor to the input shaft.

3. The rotation transmission device of claim 1, wherein the rotor is press-fitted to the input shaft.

4. The rotation transmission device of claim 1, wherein the bearing support tube has a radially outwardly extending flange at an axial end thereof, the flange abutting and being joined to the axial outer end surface of the core such that a portion of the core is located between the electromagnetic coil and the flange, the outwardly extending flange having a radially outer surface fitted to a radially inner surface of the housing, and the core having a radially outer surface which is uniform in diameter over an entire axial length of the core.

5. The rotation transmission device of claim 4, further comprising a key mounted to rotationally fix the rotor to the input shaft.

6. The rotation transmission device of claim 4, wherein the rotor is press-fitted to the input shaft.

\* \* \* \* \*